United States Patent
Okada et al.

(10) Patent No.: US 10,027,960 B2
(45) Date of Patent: Jul. 17, 2018

(54) CODING METHOD AND CODING DEVICE

(71) Applicant: Hitachi Maxell, Ltd., Ibaraki-shi, Osaka (JP)

(72) Inventors: Mitsuhiro Okada, Tokyo (JP); Keisuke Inata, Tokyo (JP)

(73) Assignee: Maxell, Ltd., Kyoto (JP)

( * ) Notice: Subject to any disclaimer, the term of this patent is extended or adjusted under 35 U.S.C. 154(b) by 51 days.

(21) Appl. No.: 14/653,483

(22) PCT Filed: Mar. 25, 2013

(86) PCT No.: PCT/JP2013/058487
§ 371 (c)(1),
(2) Date: Jun. 18, 2015

(87) PCT Pub. No.: WO2014/155471
PCT Pub. Date: Oct. 2, 2014

(65) Prior Publication Data
US 2015/0350649 A1    Dec. 3, 2015

(51) Int. Cl.
*H04N 7/12* (2006.01)
*H04N 19/124* (2014.01)
*H04N 19/139* (2014.01)
*H04N 19/176* (2014.01)
*H04N 19/14* (2014.01)
(Continued)

(52) U.S. Cl.
CPC ........... *H04N 19/124* (2014.11); *B60W 50/14* (2013.01); *G06K 9/00791* (2013.01); *G08G 1/167* (2013.01); *H04N 19/134* (2014.11); *H04N 19/139* (2014.11); *H04N 19/14* (2014.11); *H04N 19/17* (2014.11);
(Continued)

(58) Field of Classification Search
CPC .. H04N 19/124; H04N 19/174; H04N 19/134; H04N 19/139; H04N 19/176; H04N 19/17; H04N 19/14; H04N 19/436; G06K 9/00791; G08G 1/167; B60W 50/14
USPC ..................................................... 375/240.03
See application file for complete search history.

(56) References Cited

U.S. PATENT DOCUMENTS 5,016,010 A    5/1991   Sugiyama
2003/0035477 A1  2/2003   Sekiguchi et al.
(Continued)

FOREIGN PATENT DOCUMENTS

JP    2-194734 A    8/1990
JP    05-041806 A   2/1993
(Continued)

OTHER PUBLICATIONS

International Search Report of PCT/JP2013/058487 dated Sep. 17, 2013.

*Primary Examiner* — Allen Wong
(74) *Attorney, Agent, or Firm* — Mattingly & Malur, PC

(57) ABSTRACT

In related art, it is not considered that the image quality of video to be transmitted can be improved in consideration of a delay time in video transmission. An image information coding method includes an analyzing step of analyzing an input image, a quantization parameter calculating step of calculating a quantization parameter by using analysis results in the analyzing step, and an encoding step of encoding the input image by using the quantization parameter calculated in the quantization parameter calculating step, wherein a first region to be analyzed in the analyzing step has a variable size.

4 Claims, 13 Drawing Sheets

(51) Int. Cl.
  *H04N 19/17* (2014.01)
  *B60W 50/14* (2012.01)
  *G08G 1/16* (2006.01)
  *H04N 19/134* (2014.01)
  *H04N 19/174* (2014.01)
  *G06K 9/00* (2006.01)
  *H04N 19/436* (2014.01)

(52) U.S. Cl.
  CPC ......... *H04N 19/174* (2014.11); *H04N 19/176* (2014.11); *H04N 19/436* (2014.11)

(56) References Cited

U.S. PATENT DOCUMENTS

| | | | | |
|---|---|---|---|---|
| 2006/0093032 A1* | 5/2006 | Shindo | ................ | H04N 19/172 375/240.03 |
| 2010/0002765 A1* | 1/2010 | Kondo | ................ | H04N 19/176 375/240.12 |
| 2012/0087595 A1* | 4/2012 | Minezawa | ........... | H04N 19/167 382/233 |

FOREIGN PATENT DOCUMENTS

| | | | |
|---|---|---|---|
| JP | 11-164305 A | 6/1999 |
| JP | 2000-270323 A | 9/2000 |
| JP | 2009-246540 A | 10/2009 |

* cited by examiner

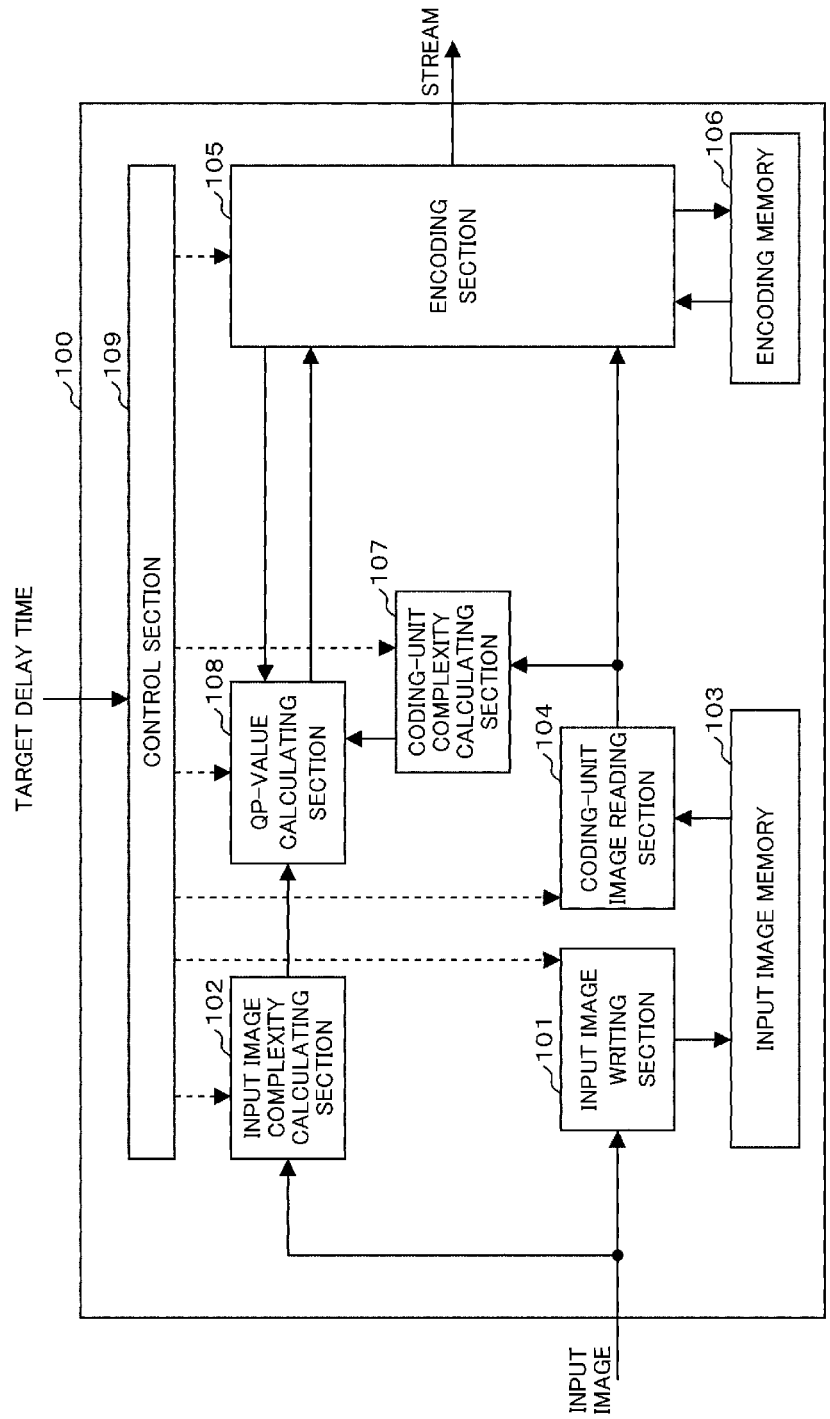
F I G. 1

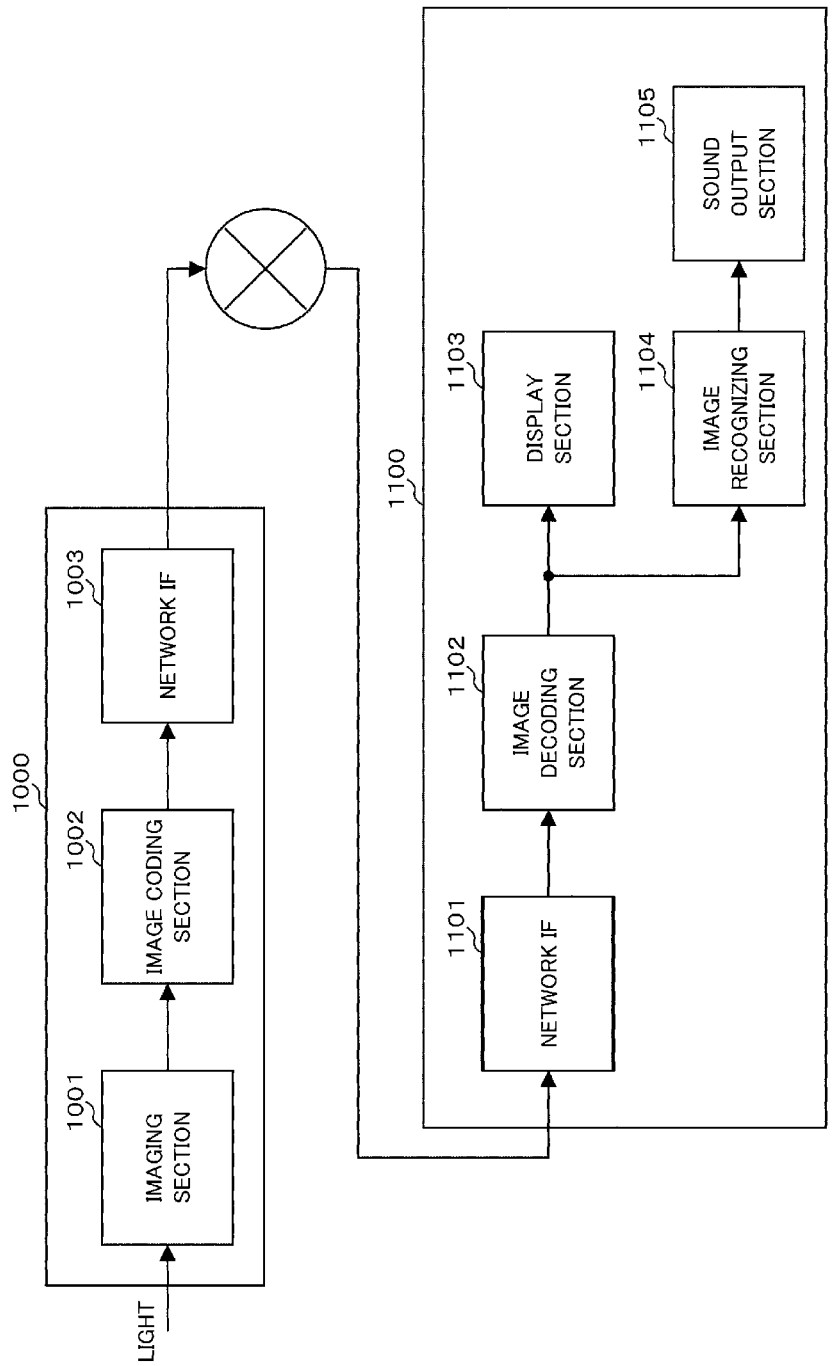
F I G. 6

F I G. 7
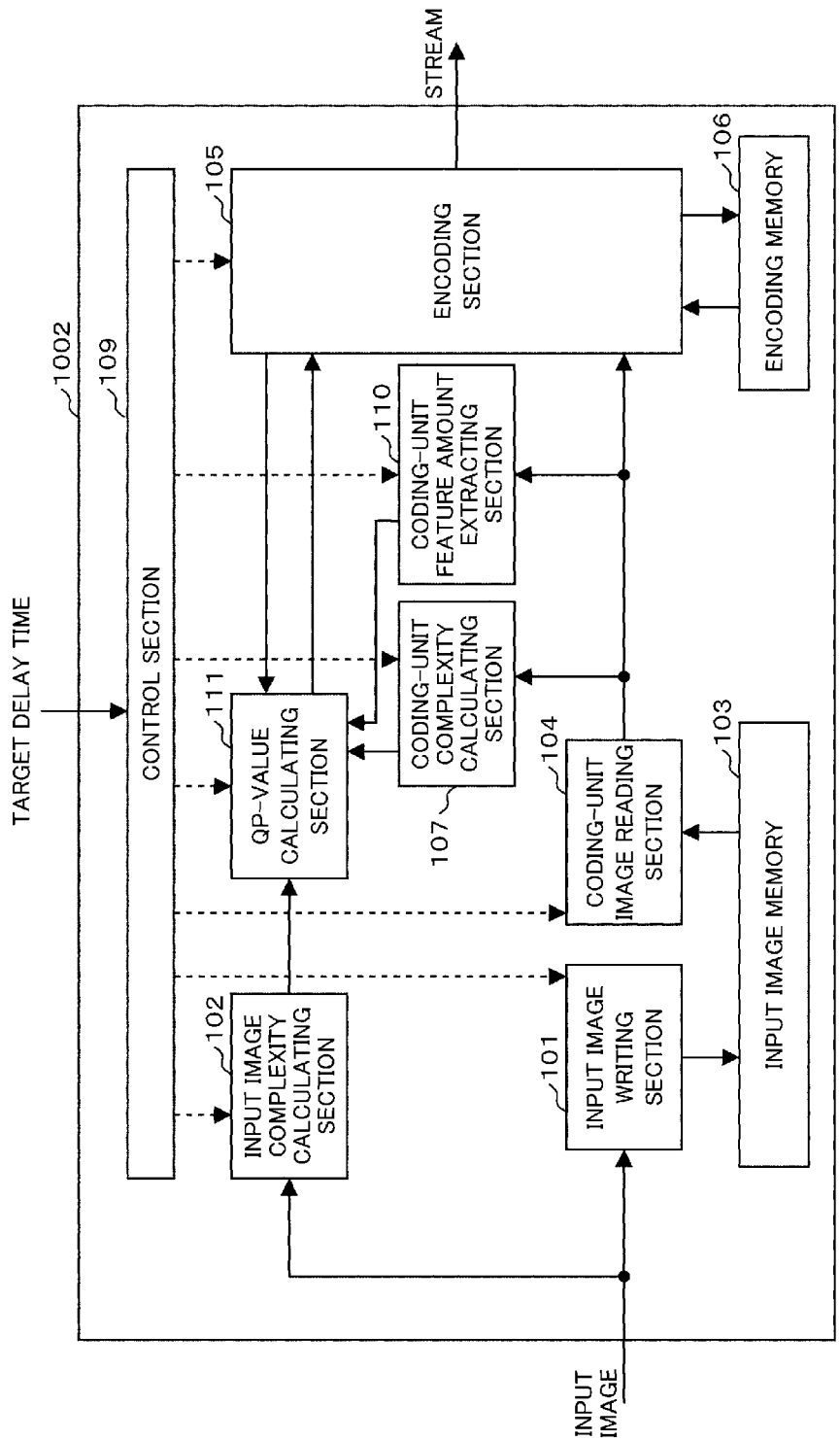

| WHITE-LINE FEATURE AMOUNT | FEATURE AMOUNT QP |
|---|---|
| 0 | 0 |
| 1 | −1 |
| 2 | −2 |

F I G. 1 0

| APPLICATION | ASSUMED SPEED | TARGET DELAY TIME |
|---|---|---|
| REAR OBSTACLE DETECTION FOR PARKING | SPEED OF 20 km PER HOUR OR SLOWER | 33.3ms |
| WHITE-LINE RECOGNITION FOR HIGH-SPEED TRAVELING | SPEED OF 100 km PER HOUR OR FASTER | 1ms |
| SIGN RECOGNITION IN URBAN AREA | SPEED OF 40 TO 80 km PER HOUR | 10ms |

F I G. 1 4
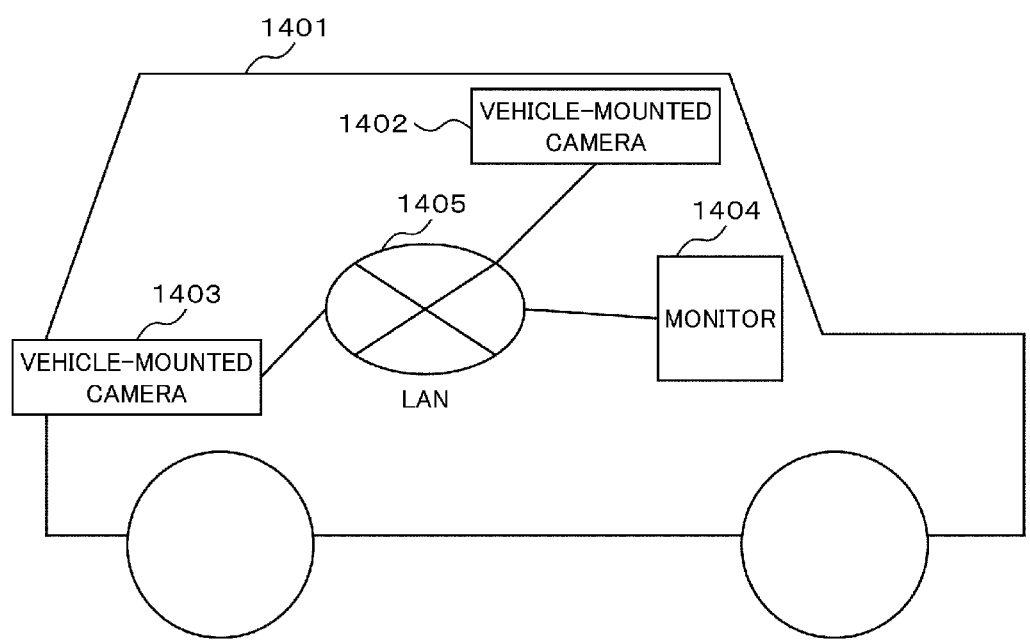

CODING METHOD AND CODING DEVICE

TECHNICAL FIELD

The technical field relates to image coding.

BACKGROUND ART

PTL 1 describes that "while high coding efficiency can be obtained by entropy coding in a conventional data amount control scheme by feedback control, a data amount cannot be made within a certain amount in units of frames or the like, and it is therefore difficult to apply this scheme to a storage-type medium" or the like is taken as a problem and, as a solution to the problem, "to provide a coded output data amount control scheme in which a data amount is controlled so that a coded output data amount in each predetermined segment defined in advance is within predetermined values so that high efficiency coding is performed, the coded output data control scheme including: means which predicts a data amount by taking a segment shorter than the predetermined segment defined in advance as a unit; means which controls a coding process so that a total predicted data amount in the predetermined segment defined in advance is constant based on the predicted data amount obtained by the above-described predicting means; and means which accumulates a difference between the predicted data amount obtained by the above-described predicting means and an actually coded data amount and controls the coding process based on results of the above-described accumulation".

Also, PTL 2 describes that "to provide an image signal coding control device with small-sized hardware in which code amount assignment is performed with optimum efficiency and a decoded image with less degradation in image quality can be obtained" (refer to [0010] in PTL 2) is taken as a problem and, as a solution to the problem, "an image signal coding control device including a quantization parameter initialization value computing section, a macroblock line quantization parameter computing section, a macroblock activity calculating section, an activity average value calculating section, and a complexity computing section, the device including a classifying section which classifies, based on activities and an activity average value outputted from the activity calculating section and the activity average value calculating section, macroblocks into classes set in advance and outputs class information, and a conversion table section which selects and refers to a conversion table in which table information corresponding to characteristics of the classes are written, according to the class information, and converts a macroblock line quantization parameter outputted from the macroblock line quantization parameter computing section to a quantization parameter for each macroblock" (refer to [0011] in PTL 2).

CITATION LIST

Patent Literature

PTL 1: Japanese Patent Application Laid-Open No. 2-194734

PTL 2: Japanese Patent Application Laid-Open No. 2000-270323

SUMMARY OF INVENTION

Technical Problem

However, in any of these Patent Literatures, it is not considered that the image quality of video to be transmitted can be improved in consideration of a delay time in video transmission.

Solution to Problems

To solve the problem described above, for example, the structure described in the scope of claims for patent is adopted.

The present application includes a plurality of solutions for the above-described problems, and an example of the solutions is as follows:

an analyzing step of analyzing an input image, a quantization parameter calculating step of calculating a quantization parameter by using analysis results in the analyzing step, and an encoding step of encoding the input image by using the quantization parameter calculated in the quantization parameter calculating step are included, and a first region to be analyzed in the analyzing step has a variable size.

Advantageous Effects of Invention

According to the above-described means, the image quality of video to be transmitted can be improved in consideration of a delay time in video transmission.

BRIEF DESCRIPTION OF DRAWINGS

FIG. 1 is an example of a structural diagram of an image coding device.

FIG. 6 is an example of a structural diagram of a vehicle-mounted camera system.

FIG. 7 is an example of a structural diagram of an image coding device.

FIG. 10 depicts examples of a target delay time.

FIG. 14 depicts an example of a vehicle-mounted camera system.

DESCRIPTION OF EMBODIMENTS

Moving image compression is used in many applications. In particular, for use purposes such as videoconference systems and vehicle-mounted network camera systems, there are needs for transmitting images with low delay by using image compression, and image coding technology for transmitting compressed images with low delay and high image quality is required.

In a method of transmitting compressed images with low delay, a code amount generated at the time of coding is made constant. By making the generated code amount constant, buffer delay for smoothing the generated code amount can be eliminated, and therefore low delay can be achieved.

PTL 1 discloses the invention of controlling the data amount so that the coding output data amount for each predetermined segment is within predetermined values. As such, inhibiting fluctuations of the code amount as much as possible to make the code amount for each segment uniform as much as possible is effective, to some extent, in inhibiting buffer delay. However, since feedback processing is performed according to the generated code amount and irrespectively of the picture pattern of the image, bit allocation suitable for the picture pattern of the image is difficult, and image quality is considered to be degraded.

On the other hand, in the technical idea of PTL 2, a Q parameter is determined by using a macroblock and an activity average value for one entire screen to perform efficient code assignment, thereby making it possible to compression coding with less degradation in image quality. However, PTL 2 only describes that activities for one entire screen are used, and, in particular, does not describe a method of handling for use in a low-delay image transmission system with one frame or less. Moreover, since the structure is such that activities of macroblocks are added together to find an activity average value for one entire screen, values of previous frames are used for the activity average value for one entire screen. Therefore, when the picture pattern is abruptly changed, the generated code amount may be increased or decreased, and it is considered that the generated code amount cannot be accurately estimated.

In the following, examples of transmitting a compressed image with low delay and high image quality are described by using the drawings.

Example 1

In the present example, an example of an image coding device which performs image coding is described. In the present example, an example is described in which H.264 is used for image coding.

Figure 12:
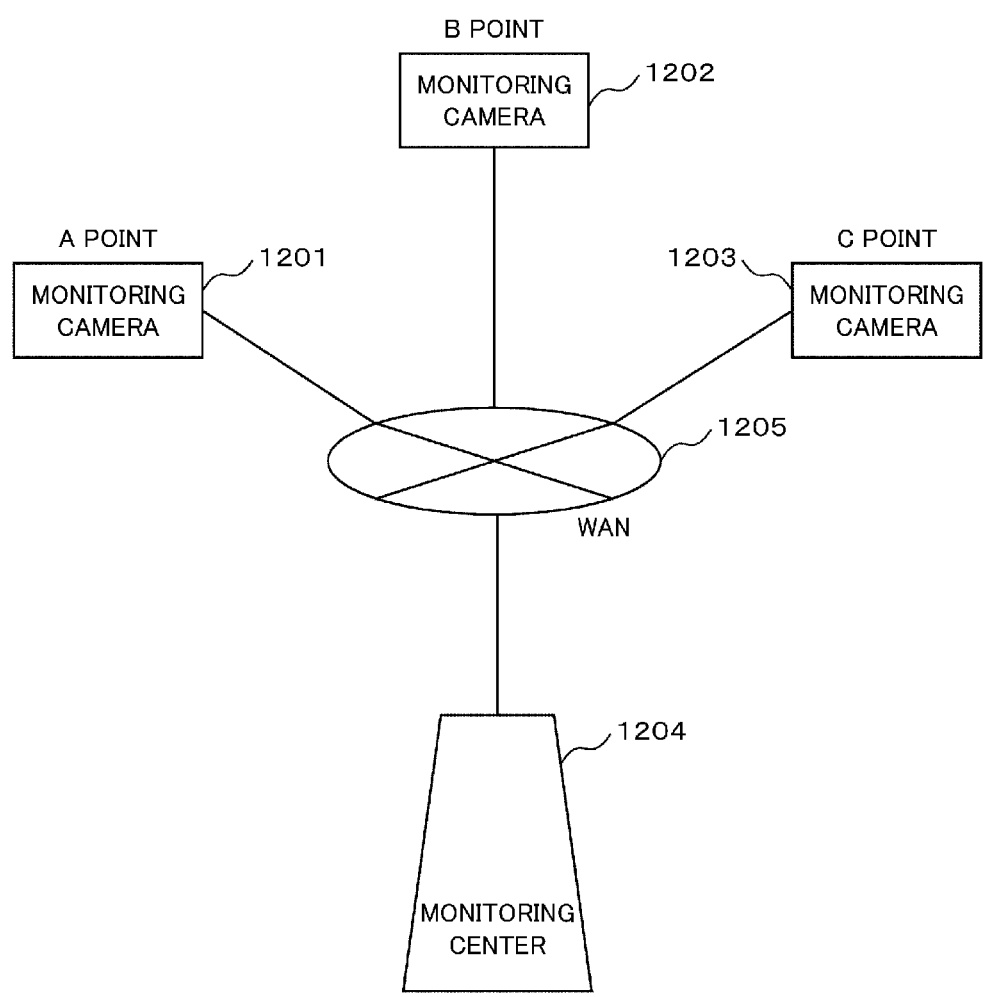
FIG. 12 depicts an example of a monitoring camera system.
Figure 13:
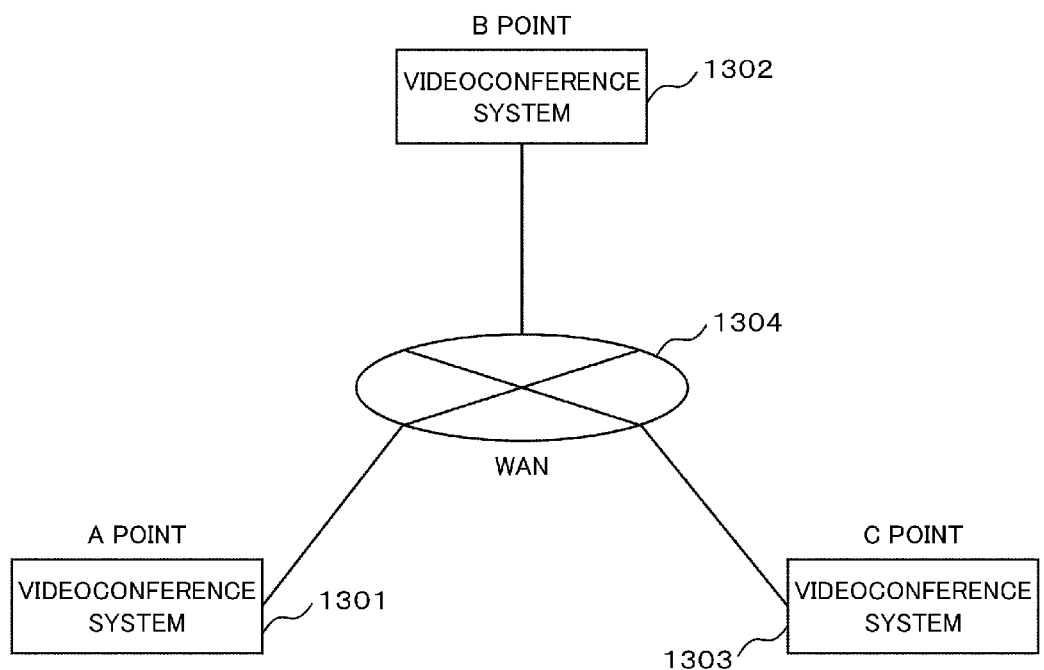
FIG. 13 depicts an example of a videoconference system.

First, an image transmission system to which the image coding device of the present example is applied is described by using FIGS. 12 to 14. FIG. 12 is a diagram depicting an example of a monitoring camera system, FIG. 13 is a diagram depicting an example of a videoconference system, and FIG. 14 is a diagram depicting an example of a vehicle-mounted camera system.

In FIG. 12, 1201, 1202, 1203 denote monitoring cameras installed at an A point, a B point, and a C point, respectively; 1204 denotes a monitoring center which receives images taken by the monitoring cameras 1201, 1202, and 1203; and 1205 denotes a wide area network (WAN) such as the Internet line. Video taken by the monitoring cameras 1201 to 1203 can be displayed on a monitor or the like in the monitoring center 1204 via the WAN 1205. While the example is depicted in FIG. 12 where three monitoring cameras are provided, the number of monitoring cameras may be two or less, or four or more.

The image coding device of the present example is mounted on, for example, the monitoring cameras 1201 to 1203. The image coding device performs a coding process, which will be described further below, on input images inputted via the lenses of the monitoring cameras 1201 to 1203, and the input images subjected to the coding process are outputted to the WAN 1205.

In FIG. 13, 1301, 1302, and 1303 denote videoconference systems installed at an A point, a B point, and a C point, respectively, and 1304 denotes WAN such as the Internet line. Video taken by the cameras of the videoconference systems 1301 to 1303 can be displayed on monitors or the like of the videoconference systems 1301 to 1303 via the WAN 1304. While the example is depicted in FIG. 13 where three videoconference systems are provided, the number of videoconference systems may be two, or four or more.

The image coding device of the present example is mounted on, for example, the cameras of the videoconference systems 1301 to 1303. The image coding device performs a coding process, which will be described further below, on input images inputted via the lenses of the videoconference systems 1301 to 1303, and the input images subjected to the coding process are outputted to the WAN 1304.

In FIG. 14, 1401 denotes an automobile; 1402 and 1403 denote vehicle-mounted cameras mounted on the automobile 1401; 1404 denotes a monitor which displays video taken by the vehicle-mounted cameras 1402 and 1403; and 1405 denotes a local area network (LAN) in the automobile 1401. Video taken by the vehicle-mounted cameras 1402 and 1403 can be displayed on the monitor 1404 via the LAN 1405. While the example is depicted in FIG. 14 where two vehicle-mounted cameras are provided, the number of vehicle-mounted cameras may be one, or three or more.

The image coding device of the present example is mounted on, for example, the vehicle-mounted cameras 1402 and 1403. The image coding device performs a coding process, which will be described further below, on input images inputted via the lenses of the vehicle-mounted cameras 1402 and 1403, and the input images subjected to the coding process are outputted to the LAN 1405.

Next, the image coding device of the present example is described. FIG. 1 is an example of a structural diagram of the image coding device. An image coding device 100 is configured of an input image writing section 101, an input image complexity calculating section 102, an input image memory 103, a coding-unit image reading section 104, an encoding section 105, an encoding memory 106, a coding-unit complexity calculating section 107, a QP (quantization parameter)-value calculating section 108, and a control section 109.

The input image writing section 101 performs a process of writing input images inputted in a raster scanning sequence into the input image memory 103.

The image complexity calculating section 102 calculates complexity by using the input image before writing into the memory, and outputs input image complexity. Here, the complexity is an index indicating the degree of difficulty of a picture pattern of the input image in a region for a target delay time, and is given by, for example, a variance var described in (Equation 1).

$$\text{var} = \frac{1}{N \times M} \sum_{j=1}^{M} \sum_{i=1}^{N} (x_{(i,j)} - X)^2 \quad \text{(Equation 1)}$$

required target delay time is varied according to the situation.

The input image memory 103 is a memory for use to which once store input images inputted in a raster scanning sequence and successively read MB images in coding units (in the case of H.264, macroblocks (hereinafter referred to as "MB") of 16 pixels×16 pixels). This memory may be an external memory such as an SDRAM or an internal memory such as an SRAM.

The coding-unit image reading section 104 is a block which reads MB images from the input image memory 103. The MB images read by the coding-unit image reading section 104 are supplied to the encoding section 105 and the coding-unit complexity calculating section 107.

The coding-unit complexity calculating section 107 calculates complexity for each MB by using MB images, and outputs coding-unit complexity. This is calculated by using the same dispersion formula (Equation 1) as that in the input image complexity calculating section 102. Here, in the case of H.264, since MB is 16 pixels×16 pixels, N and M are both 16.

The QP-value calculating section 108 outputs a QP value for each MB by using the input image complexity, the coding-unit complexity, and the generated code amount generated at the time of actual encoding at the encoding section 105. QP indicates a quantization parameter, that is, a quantization parameter, and a QP-value calculating method will be described further below by providing a specific example.

The encoding section 105 performs an encoding process by using the MB images outputted from the coding-unit image reading section 104 and the QP value outputted for each MB from the QP-value calculating section 108 to generate a stream.

The encoding memory 106 is a memory which accumulates reproduced images for use in prediction processing, and may be either of an SDRAM or SRAM, similarly to the input image memory. While the input image memory 103 and the encoding memory 106 are depicted in FIG. 1 as being separated, they are not required to be separated, and one SDRAM may be used.

The control section 109 is a block which controls each of the process blocks depicted in FIG. 1 (the input image writing section 101, the input image complexity calculating section 102, the coding-unit image reading section 104, the encoding section 105, the coding-unit complexity calculating section 107, and the QP-value calculating section 108). A control method will be described further below by providing a specific example.

Note that a structure including the input image complexity calculating section 102 and the coding-unit complexity calculating section 107 is also simply referred to as an analyzing section.

Figure 2:
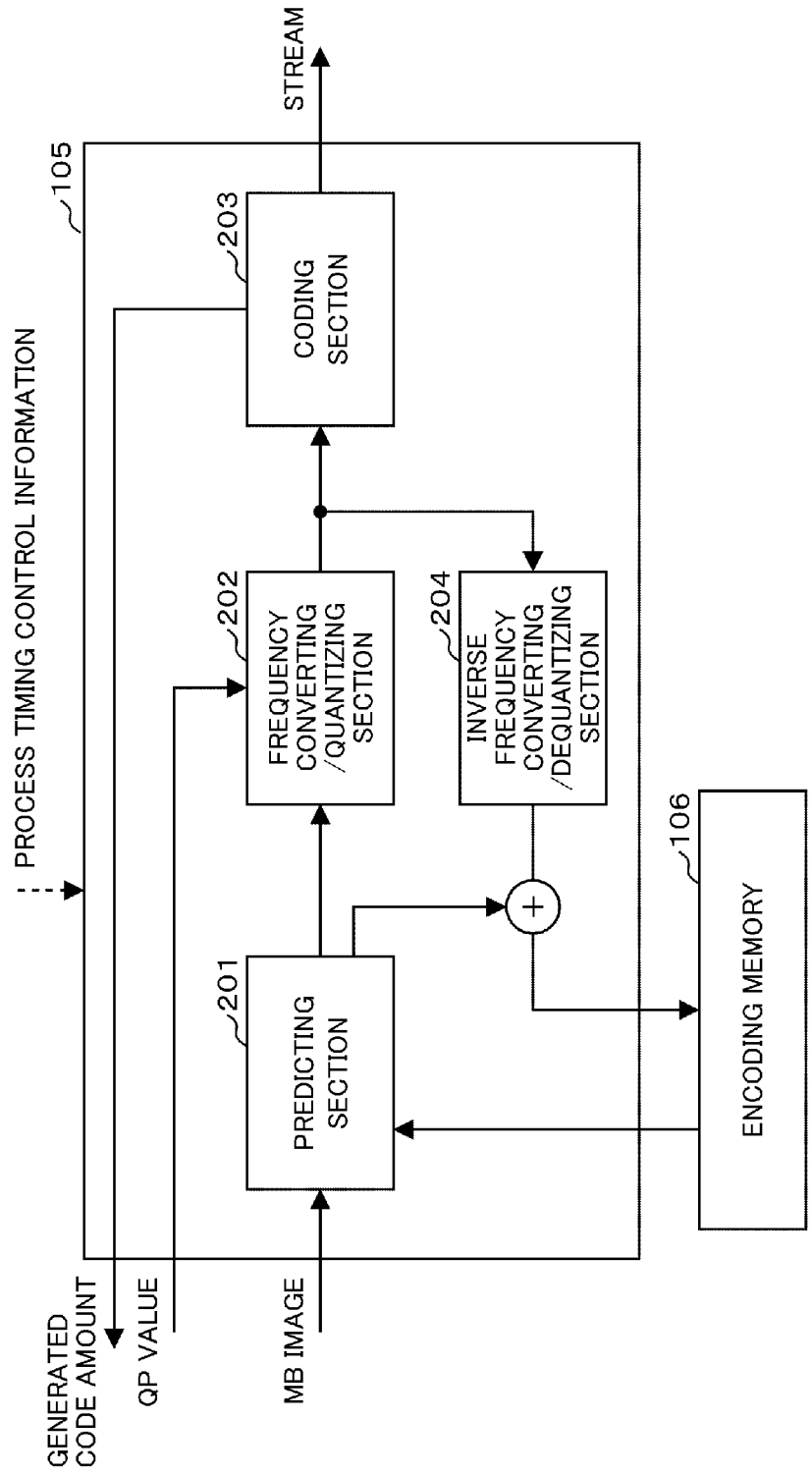
FIG. 2 is an example of a structural diagram of an encoding section.

Next, details of the encoding section 105 are described by using FIG. 2. The encoding section 105 is configured of a predicting section 201, a frequency converting/quantizing section 202, a coding section 203, and an inverse frequency converting/dequantizing section 204.

First, the predicting section 201 takes the MB images as inputs, and selects one of intra prediction and interframe prediction which is more efficient to generate a predicted image. Then, the generated predicted image and an error image obtained by subtracting the predicted image from a current image are outputted. Intra prediction is a method of generating a predicted image by using a reproduced image of an adjacent MB stored in the encoding memory 106, and interframe prediction is a method of generating a predicted image by using a reproduced image of a previous frame stored in the encoding memory 106.

The frequency converting/quantizing section 202 performs frequency conversion on the error image, and then outputs a quantization coefficient obtained by quantizing a transformation coefficient of each frequency component based on the quantization parameter given from the QP-value calculating section.

The coding section 203 performs a coding process on the quantization coefficient outputted from the frequency converting/quantizing section 202 and outputs a stream. Also, a generated code amount for use in the QP-value calculating section 108 is outputted.

The inverse frequency converting/dequantizing section 204 dequantizes the quantization coefficient to return it to a transformation coefficient of each frequency component, and then performs inverse frequency conversion to generate an error image. Then, the predicted image outputted from the predicting section 201 is added to generate a reproduced image, which is stored in the encoding memory 106.

Next, an example of control of the control section 109 is described. As a precondition, it is assumed that an image of 1280 pixels×720 pixels and 60 fps (frame per second) is subjected to an encoding process with a target delay time of 3.33 ms.

Figure 3:
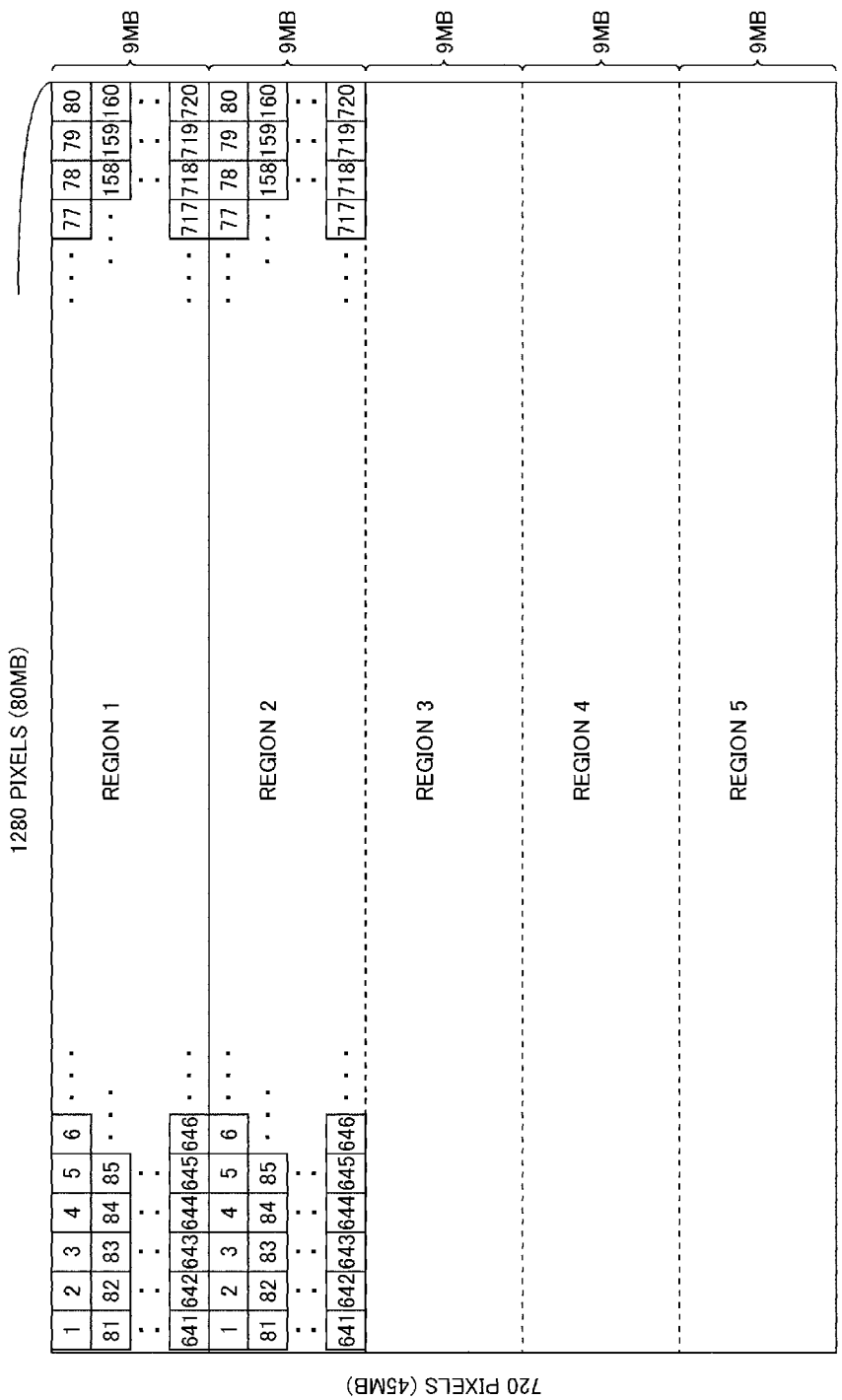
FIG. 3 depicts an example of a region for which input image complexity is calculated.

FIG. 3 is a diagram in which an image of one frame (16.666 ms per frame because of 60 fps) is divided into regions (region 1 to region 5) for each target delay time of 3.33 ms. All regions have the same size, and rectangular blocks in each region each indicate MB. A number written in each MB is a number assigned in the order of processing. In one region, the number of MBs in a lateral direction is eighty, the number of MBs in a vertical direction is nine, and the total number of MBs is 720. For each of these regions, a process is performed so as to achieve high image quality while the generated code amount is constant.

As such, with the sizes of the regions changed based on the target delay time, high image-quality processing can be performed according to the target delay time.

Figure 4:
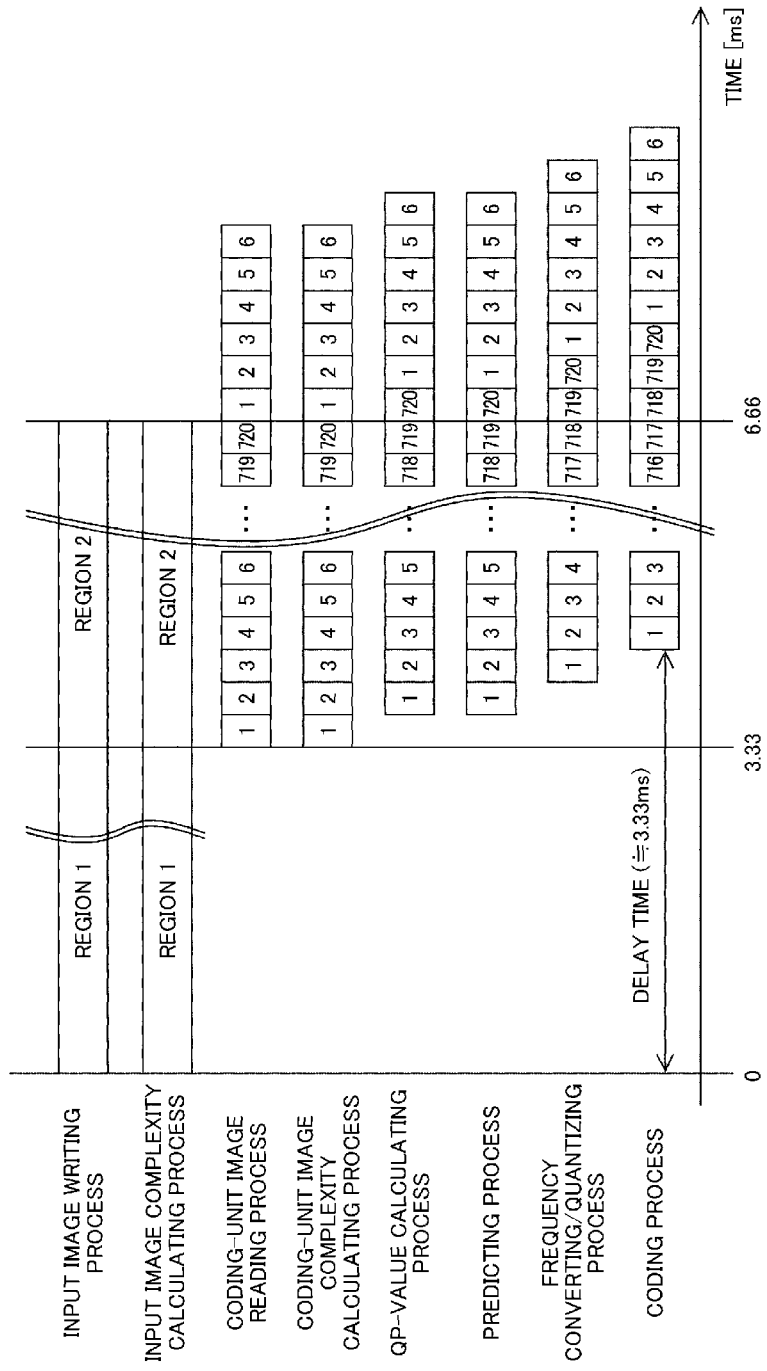
FIG. 4 is a timing diagram depicting an example of process timing of each process block.

A timing diagram is depicted in FIG. 4, depicting process timing of each of the process blocks depicted in FIGS. 1 and 2 (the input image writing section 101, the input image complexity calculating section 102, the coding-unit image reading section 104, the encoding section 105, the coding-unit complexity calculating section 107, the QP-value calculating section 108, the predicting section 201, the frequency converting/quantizing section 202, and the coding section 203). The horizontal axis represents time and the vertical axis represents each process block, and which region or MB is being processed at which timing can be seen for each process block. Control over this process timing is performed by the control section 109 depicted in FIG. 1. The respective processes of the encoding section 105 form pipeline processing for each MB as depicted in FIG. 4. Here, the pipeline processing is a scheme for performing high-speed processes by dividing a coding process for each MB into a plurality of steps (stages) and concurrently performing processes at respective stages.

First, an input image writing process of the input image writing process 101 and an input image complexity calculating process of the input image complexity calculating section 102 are concurrently performed. When input images in the region 1 are all written into the input image memory 103, a coding-unit image reading process of the coding-unit image reading section 104 is performed, and outputs are produced to the encoding section 105 and the coding-unit complexity calculating section 107. Here, concurrently with reading, coding-unit complexity calculation of the coding-unit complexity calculating section 107 is performed.

Next, a QP calculating process of the QP-value calculating section 108 and a predicting process of the predicting section 201 are concurrently performed. Furthermore, in the frequency converting/quantizing section 202, the QP value calculated in the immediately previous QP-value calculating process is used to perform a frequency converting/quantizing process. Finally, a coding process of the coding section 203 is performed to output a stream.

Here, a delay time due to an actual encoding process is from a time when an input image is inputted to a time when a stream is outputted from the coding section 203. Thus, the delay time is obtained by adding a time for processing for 3 MB to the time 3.33 ms in which the region 1 is inputted. The process time for 3 MB is on the order of several tens of microseconds (16.666 ms/36000 MB×3 MB=0.014 ms) and is sufficiently small. Therefore, in the present specification, the time from the time when an input image is inputted to the time when a stream is outputted from the coding section 203 is regarded as approximately 3.33 ms.

As such, after input image complexity is calculated by using the input image in the region for the target delay time, an actual encoding process starts. Therefore, since the degree of coding difficulty of the picture pattern of the input image in the region for the target delay time can be found, bit allocation suitable for the region for the target delay time can be performed and high image quality can be achieved. Here, when the target delay time is changed, this can be addressed by changing the region size correspondingly to the target delay time and changing the start timing of the encoding process.

Figure 5:
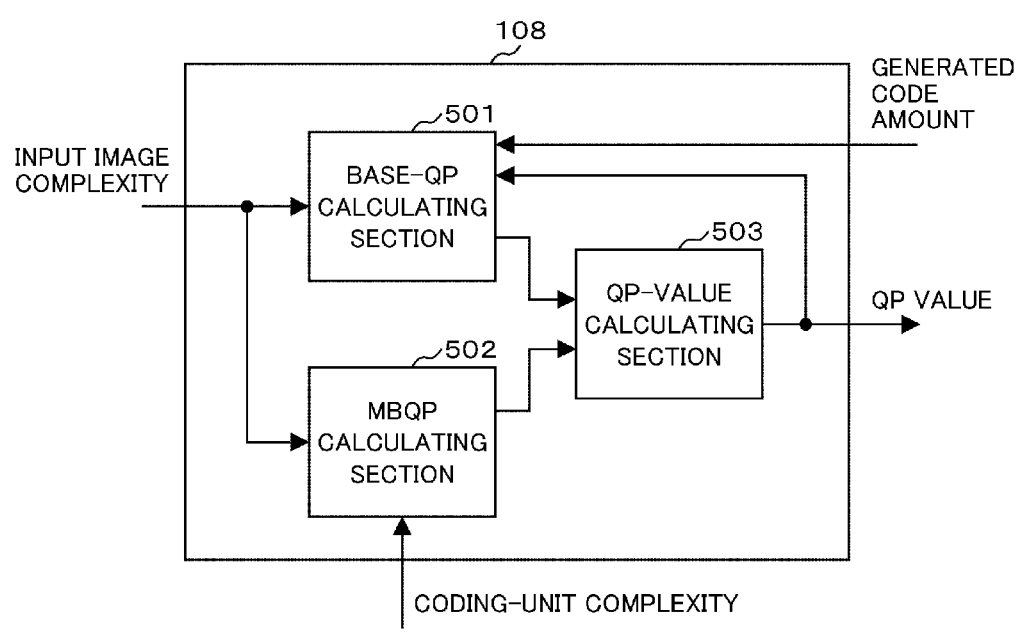
FIG. 5 is an example of a structural diagram of a QP-value calculating section.

Next, a specific example of a QP value determining method is described by using FIG. 5. FIG. 5 is a diagram depicting details of the inside of the QP-value calculating section 108, which is configured of a base-QP calculating section 501, an MB (macroblock) QP calculating section 502, and a QP calculating section 503.

The base-QP calculating section 501 is a process to be performed only at the time of crossing regions (region 1 to region 5) and outputs a base QP of a region to be processed next by using input image complexities and code amounts. This base QP is given by the following (Equation 2).

$$\text{Base } QP = QP_{ave} + 6 \times \log_2\left(\frac{\text{bitrate}}{\text{target\_bitrate}}\right) + \alpha \times \frac{\text{var}_{next}}{\text{var}_{pre}} \quad \text{(Equation 2)}$$

Here, $QP_{ave}$ represents an average QP value of the previous region, bitrate represents a generated code amount of the previous region, target_bitrate is a target code amount of the next region, α represents a coefficient, $\text{var}_{next}$ represents input image complexity of the next region, and $\text{var}_{pre}$ represents input image complexity of the previous region. From (Equation 2), the base QP of the next region can be determined, with the generated code amount of the previous region and the input image complexity of the next entire region taken into consideration, and therefore the generated code amount can be accurately estimated. Furthermore, since a loop process is performed based on the average QP value and the generated code amount at the time of the previous coding, (Equation 2) is optimized in accordance with the image, thereby decreasing an error between the estimated code amount and the actual generated code amount.

Next, the MBQP calculating section 502 is a process to be performed for each MB, and outputs MBQP from the coding-unit complexity and the input image complexity. This MBQP is given by (Equation 3).

$$MBQP = \beta \times \log_2\left(\frac{\text{Coding-unit complexity}}{\text{Input image complexity}}\right) \quad \text{(Equation 3)}$$

Where $\gamma \leq MBQP \leq -\gamma$

Here, β represents a coefficient, and γ represents a limiter value. It is assumed that γ is taken when MBQP is larger than γ and −γ is taken when MBQP is smaller than −γ. By using (Equation 3), for MB of a complex picture pattern with the coding unit complexity larger than the input image complexity, MBQP is increased to suppress the generated code amount. Conversely, for MB of a flat picture pattern with the coding unit complexity smaller than the input image complexity, MBQP is decreased to allocate the code amount, thereby improving subjective image quality.

As such, appropriate bit allocation suited for human visual characteristics sensitive to degradation in flat picture patterns can be made, and high image quality can be achieved. Also, since this process increases MBQP of a complex picture pattern with a large generated code amount and decreases MBQP of a flat picture pattern with a small generated code amount, this process has effects of not only improving subjective image quality but also smoothing the generated code amount for each MB.

Finally, the QP calculating section 503 calculates a QP value by an equation described in (Equation 4).

$$QP \text{ value} = \text{Base } QP + MBQP \quad \text{(Equation 4)}$$

As described above, in the coding device 100 described in Example 1, with the process of making the generated code amount in the base-QP calculating section 501 of the QP-value calculating section 108 constant and control of the QP value according to the picture pattern in the MBQP calculating section 502 of the QP-value calculating section 108, high image quality can be achieved, while the generated code amount for each target delay time is made constant.

Also, the structure of Example 1 is effective also when the target delay time is changed during encoding or for each application. When coding-unit complexity for each coding unit is calculated concurrently with calculation of input image complexity at the input image complexity calculating section 102, coding unit complexities as many as the number of MBs in the region for the target delay time are required to be stored in memory (in the example of Example 1, memory for 720 MB is required).

By contrast, in the structure of Example 1, coding unit complexity is calculated at the timing of reading the coding unit image from the input image memory 103. Therefore, it is enough to have memory for delay of pipeline processing (in the example of Example 1, 1 MB because of use in the next stage), and it is enough to have fixed memory irrespectively of the target delay time. This is particularly effective because memory of a small fixed amount is enough for coding an image of a large image size such as 4 k 8 k size.

Also, the structure can be achieved without changing the pipeline processing during encoding, and delay of the encoding process due to introduction of this process does not occur.

While an example of the target delay time equal to or smaller than one frame has been described in Example 1, in the case of an accumulation use purpose, a real-time property is not required, and therefore the target delay time may be set late as long as the capacity of the memory permits. For example, when a time for three frames is set as a target delay time, bit allocation can be performed after three input images are analyzed, and therefore high image quality can be achieved.

Furthermore, while an example has been described in which input images are inputted in a raster scanning sequence, in place of the raster scanning sequence, for example, images may be inputted all at once for each K pixels×L pixels.

Still further, while an example regarding H.264 has been described, similar effects are obtained by using the present structure as long as a moving image coding scheme with a parameter capable of changing image quality for each coding unit (such as MPEG2 or next-generation moving image coding scheme HEVC (H.265)) is used.

Still further, while an example has been described in which the complexity is a variance, the complexity is not restricted to a variance as long as it is an index indicating image complexity, such as a total of differential values from adjacent pixels or a total value from an edge detection filter (such as a Sobel filter or Laplacian filter).

Still further, while a specific QP-value determining scheme of the QP-value calculating section 108 has been described by using FIG. 5, the scheme is not restricted to this process. It is enough to achieve high image quality while the generated code amount is made constant according to the target delay time by using at least the input image complexity, the coding-unit complexity, and the generated code amount.

Still further, while an example has been described in which the size of the region for calculating complexity in the input image complexity calculating section 102 is the size of a region to be inputted in the target delay time, complexity may be calculated for each region, depending on the size of the region inputted in the target delay time. For example, while input image complexity is calculated in a region for 720 MB in the above-described example, input image complexity is assumed to be calculated for each region of 240 MB, which is ⅓ of the above-described example. In this case, a term of the code amount correction QP indicated in (Equation 4') can be added for each 240 MB. Here, a code amount correction QP is a value calculated for each 240 MB, and is calculated based on the code amount generated in the immediately previous 240 MB. For example, when the code amount generated in the immediately previous 240 MB is larger than the code amount desired to be made constant, the code amount correction QP is set at a plus value. Conversely, when the generated code amount is smaller than the code amount desired to be made constant, the code amount QP value is set at a minus value, thereby making it possible to enhance accuracy in making the generated code amount constant in the target delay time.

$$QP\ \text{value} = \text{Base}\ QP + MBQP + \text{Code amount correction}\ QP \quad \text{(Equation 4')}$$

Next, an example of the image coding device is described in which performance in image recognition processing can be improved when image recognition is performed with reproduced images in a vehicle-mounted network camera system as an example.

First, an example of a structural diagram of a presumed camera system is described by using FIG. 6. The camera system of FIG. 6 is configured of an image transmitting device 1000 and an image receiving device 1100. The image transmitting device 1000 is, for example, a vehicle-mounted camera, which is configured of an imaging section 1001 which converts light to a digital image, an image coding section 1002 which performs an encoding process on the digital image outputted from the imaging section 1001 and generates a stream, and a network IF 1003 which packetizes the stream subjected to the encoding process for output onto a network.

Also, the image receiving device 1100 is, for example, a car navigation system, which includes a network IF 1101 which receives a packet transmitted from a video transmitting device 1000 and converts the packet to a stream, an image decoding section 1102 which performs a decoding process on the stream outputted from the network IF 1101 and generates a reproduced image, a display section 1103 which causes the reproduced image outputted from the image decoding section 1102 to be displayed on a display or the like, an image recognizing section 1104 which performs image recognition processing on the reproduced image outputted from the image decoding section 1103, and a sound output section 1105 which outputs a sound when the image recognition results indicate a dangerous state for notification to a driver.

With the structure of the vehicle-mounted network camera system of FIG. 6 described above as an example, a structural diagram of an image coding section 1002 is depicted in FIG. 7 in which performance in image recognition processing can be improved when image recognition processing is performed with reproduced images. In the image coding section 1002 of FIG. 7, a portion having the same function as that of the structure provided with the same reference numeral depicted in FIG. 1 already described is not described herein.

Points different from FIG. 1 are a coding-unit feature amount extracting section 110 and a QP-value calculating section 111. The coding-unit feature amount extracting section 110 extracts an image feature amount from an MB image, and outputs a coding-unit image feature amount.

Note that a structure including the input image complexity calculating section 102, the coding-unit complexity calculating section 107, and the coding-unit feature amount extracting section is also simply referred to as an analyzing section.

Figures 8, 9:
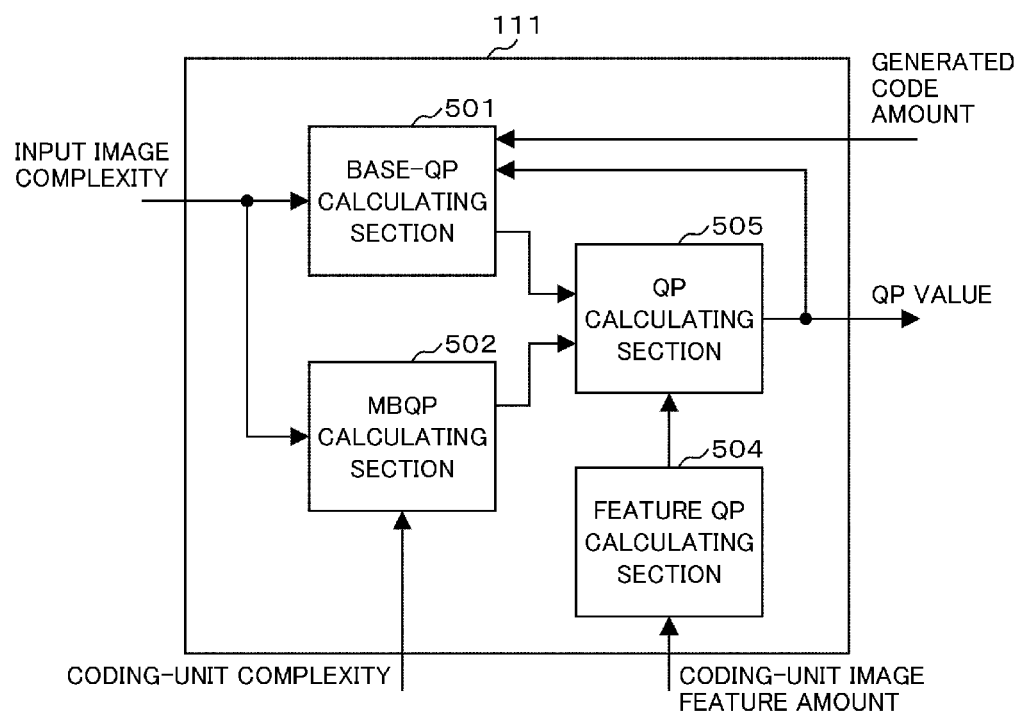
FIG. 8 is an example of a structural diagram of a QP-value calculating section.
FIG. 9 depicts an example of a conversion table of a feature QP.

The internal structure of the QP-value calculating section 111 is depicted in FIG. 8. In the QP-value calculating section 111 of FIG. 8, a portion having the same function as that of the structure provided with the same reference numeral depicted in FIG. 5 already described is not described herein.

Points different from FIG. 5 are a feature QP calculating section 504 and a QP calculating section 505. The feature QP calculating section 504 outputs a feature QP according to the size of the feature amount from the coding-unit image feature amount. The QP calculating section 505 calculates a QP value with an equation given by (Equation 5), which takes not only a base QP and MBQP but also a feature QP into consideration.

$$QP\ \text{value} = \text{Base}\ QP + MBQP + \text{Feature}\ QP \quad \text{(Equation 5)}$$

Figure 11:
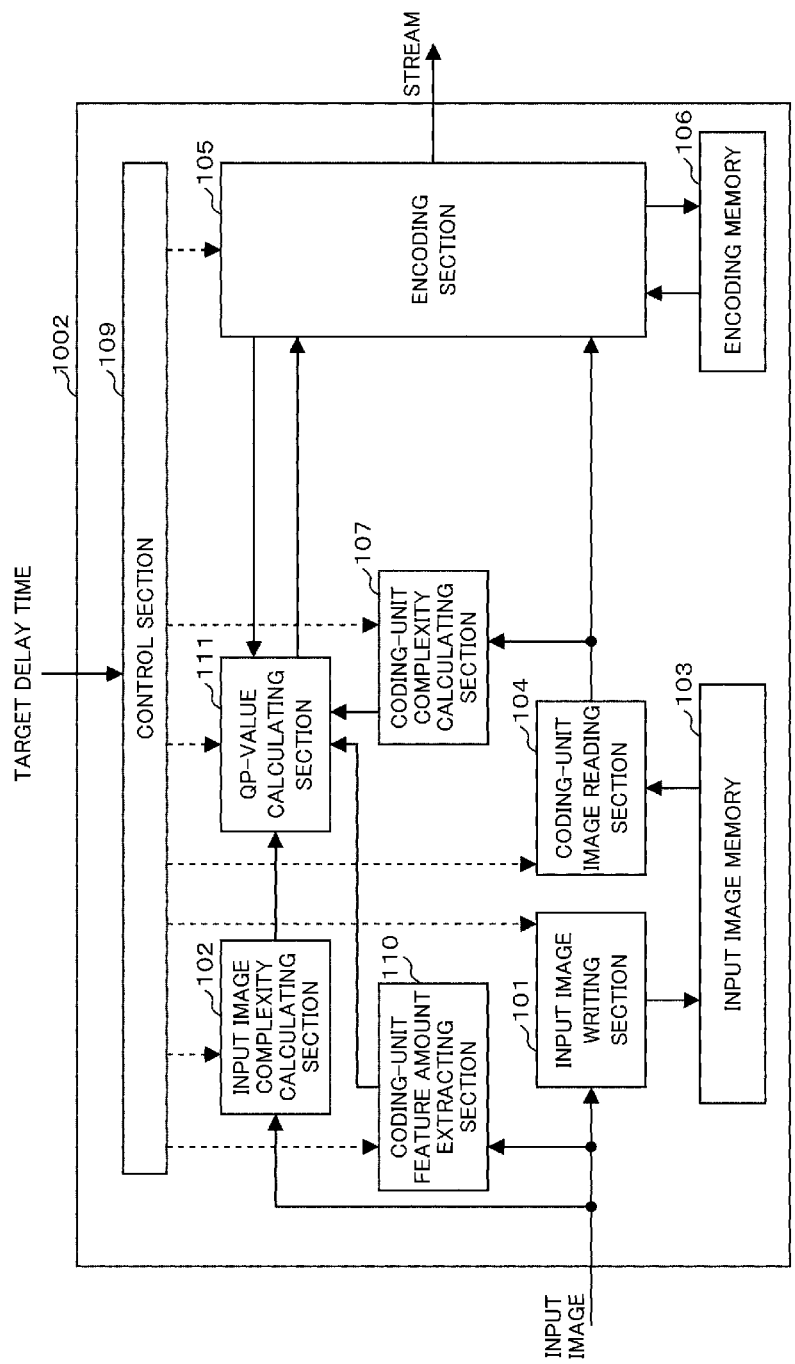
FIG. 11 is an example of a structural diagram of an image coding device.

Here, a feature QP calculating method is described when, for example, a white line drawn on a road is recognized by the receiving device 1100 of the vehicle-mounted network camera system of FIG. 6. First, the coding-unit feature amount extracting section 110 extracts a white-line feature amount required for white-line recognition. Specifically, a differential value from an adjacent pixel is calculated, and a coding-unit image feature amount is outputted, representing a three-stage white-line feature amount (three stages are 0, 1, and 2, and it is assumed that the possibility of a white line is higher as the value is larger) in which the feature amount is large when differential values with the same consecutive steps are present on a straight line. Furthermore, the feature QP calculating section 504 determines a feature amount QP from the three-stage white-line feature amount based on a table of FIG. 9. While an example of the feature amount QP determining scheme based on the table of FIG. 9 has been described by way of example in the present example, this is not meant to be restrictive. For example, the feature amount QP may be determined by using a formula such as, for example, a linear function or a Log function. Also, while an example has been described in which the differential value from the adjacent pixel is used for extracting the feature amount, any index value suffices as long as a target for which image quality is desired to be improved can be determined, such that an image of a basic pattern where a specified picture pattern is searchable is prepared in advance and the feature amount QP is determined by using the results of pattern matching with that basic pattern (similarity). Also, while an example has been described in the present example in which the feature amount is calculated in coding units, the structure may be such that the feature amount is calculated in a region where the input image complexity calculating section 102 performs calculation, as depicted in FIG. 11.

FIG. 10 depicts an example in which a target delay time is changed according to the application, with the vehicle-mounted network camera system of FIG. 6 as an example. As applications, rear obstacle detection for parking, white-line deviation warning for high-speed traveling, sign recognition in urban-area traveling are assumed. In the vehicle-mounted network camera system, since the application for use is considered to be changed according to the speed of the vehicle, the target delay time may be changed according to the speed of the vehicle.

Obstacle detection for parking is assumed to be used at a speed equal to or faster than 20 km per hour. Since the speed is slow, a change in the image for each frame is small. Therefore, low delay equal to or slower than 10 ms is not required, and the target delay time is 33.3 ms. Therefore, high image quality can be achieved by using the analysis results for one frame.

On the other hand, white-line deviation warning for high-speed traveling is assumed to be used at a speed equal to or faster than 100 km per hour. Therefore, the image is considered to be significantly changed for each frame. When the delay time is long, even if a dangerous state is detected by image recognition processing, there is a possibility that an accident has already occurred. Therefore, a short target delay time of 1 ms is important.

Also, in sign recognition in urban-area traveling, since the speed is in a medium degree of 40 km to 80 km per hour, the target delay time is required to be shortened to some degree, but not to 1 ms, and is therefore set at 10 ms.

As such, in the case of the application of the vehicle-mounted network camera system, the target delay time is determined according to the applications for use or according to the speed of the vehicle, thereby making it possible to maximize image recognition performance of the application.

As such, when the image coding device is applied to the vehicle-mounted network camera system, an image feature toward which an algorithm of the image recognition processing of the image recognizing section 1104 of the image receiving device 1100 directs attention is simply extracted by the coding-unit feature extracting section 110 of the image transmitting device 1000, and the QP value of the relevant MB is decreased by the QP-value calculating section 111. With this, an image coding device capable of further improving performance of image recognition processing while achieving a constant code amount with respect to the target delay time and high image quality.

Also, while an example of the vehicle-mounted network camera system has been described in the present example, the imaging section 1001 may be replaced by, for example, an accumulating device such as a recorder.

Even if the image coding device is applied to a system other than the vehicle-mounted network camera system (for example, a videoconference system or the like), by setting the target delay time according to the application for use, an image to be transmitted can be made with high quality in consideration of delay in image transmission.

REFERENCE SIGNS LIST

100 IMAGE CODING DEVICE
101 INPUT IMAGE WRITING SECTION
102 INPUT IMAGE COMPLEXITY CALCULATING SECTION
103 INPUT IMAGE MEMORY
104 CODING-UNIT IMAGE READING SECTION
105 ENCODING SECTION
106 ENCODING MEMORY
107 CODING-UNIT COMPLEXITY CALCULATING SECTION
108 QP-VALUE CALCULATING SECTION
109 CONTROL SECTION
201 PREDICTING SECTION
202 FREQUENCY CONVERTING/QUANTIZING SECTION
203 CODING SECTION
204 INVERSE FREQUENCY CONVERTING/DE-QUANTIZING SECTION
501 BASE-QP CALCULATING SECTION
502 MBQP CALCULATING SECTION
503 QP-VALUE CALCULATING SECTION
1000 IMAGE TRANSMITTING DEVICE
1001 IMAGING SECTION
1002 IMAGE CODING SECTION
1003 NETWORK IF
1100 IMAGE RECEIVING DEVICE
1101 NETWORK IF
1102 IMAGE DECODING SECTION
1103 DISPLAY SECTION
1104 IMAGE RECOGNIZING SECTION
1105 SOUND OUTPUT SECTION
1201 MONITORING CAMERA
1202 MONITORING CAMERA
1203 MONITORING CAMERA
1204 MONITORING CENTER
1205 WAN
1301 VIDEOCONFERENCE SYSTEM
1302 VIDEOCONFERENCE SYSTEM
1303 VIDEOCONFERENCE SYSTEM
1304 WAN
1401 AUTOMOBILE
1402 VEHICLE-MOUNTED CAMERA
1403 VEHICLE-MOUNTED CAMERA
1404 MONITOR
1405 LAN

The invention claimed is:
1. A coding method comprising:
an input image complexity calculating step which calculates a complexity of an image of a first region of an input image;

a coding unit complexity calculating step which calculates a complexity of an image of a coding unit in the first region of the input image;

a quantization parameter calculating step of calculating a quantization parameter of the coding unit in the first region of the input image; and an encoding step of encoding the input image by using the quantization parameter calculated in the quantization parameter calculating step, wherein a size of the first region is changed based on a set target delay time, and wherein the quantization parameter calculating step calculates the quantization parameter based on the complexity of the image of the first region calculated in the input image complexity calculating step, the complexity of the image of the coding unit calculated in the coding unit complexity calculating step, an average quantization parameter value of a region of the input image prior to the first region and a code amount generated for the region of the input image prior to the first region.

2. The coding method according to claim 1, further comprising:

a coding unit feature amount extracting step which extracts a feature amount of the image of the coding unit in the first region of the input image, wherein the quantization parameter calculating step further calculates the quantization parameter based on the feature amount of the image of the coding unit extracted in the coding unit feature amount extracting step.

3. A coding device comprising:

a processor; and a memory storing an input image and instructions that, when executed by the processor, cause the processor to:

calculate a complexity of an image of a first region of an input image;

calculate a complexity of an image of a coding unit in the first region of the input image;

calculate a quantization parameter of the coding unit in the first region of the input image; and encode the input image using the calculated quantization parameter, wherein a size of the first region is changed based on a set target delay time, and wherein the quantization parameter is calculated based on the calculated complexity of the image of the first region, the calculated complexity of the image of the coding unit, an average quantization parameter value of a region of the input image prior to the first region and a code amount generated for the region of the input image prior to the first region.

4. The coding device according to claim 3, wherein the memory further stores instructions that, when executed by the processor, cause the processor to:

extract a feature amount of the image of the coding unit in the first region of the input image, wherein the quantization parameter is further calculated based on the extracted feature amount of the image of the coding unit in the first region of the input image.

* * * * *